Dec. 4, 1956  D. MEYERS  2,772,814
MEASURING VALVE FOR PRESSURE CONTAINERS
Filed April 28, 1953  3 Sheets-Sheet 3
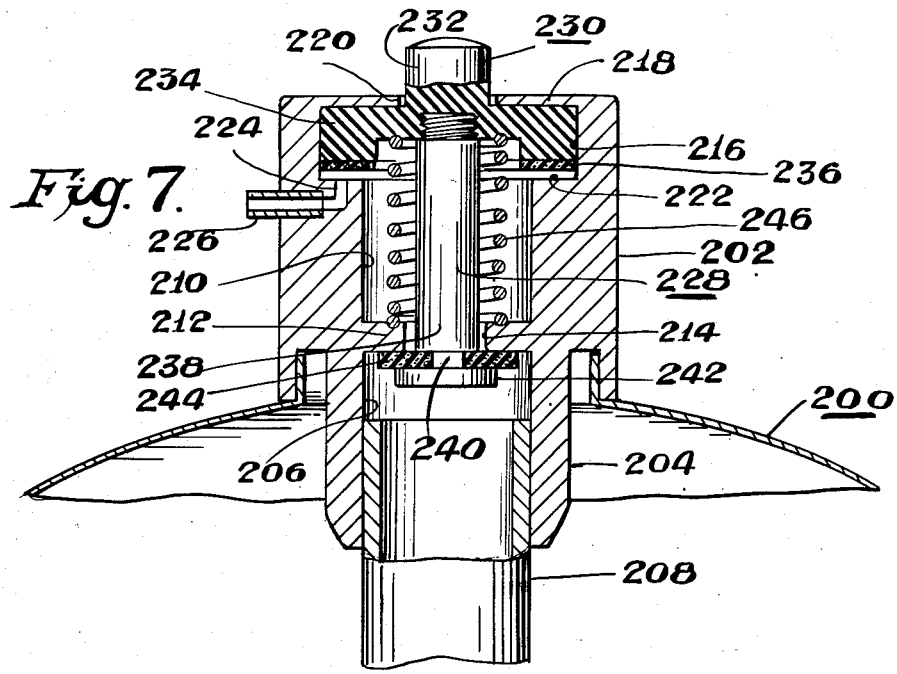
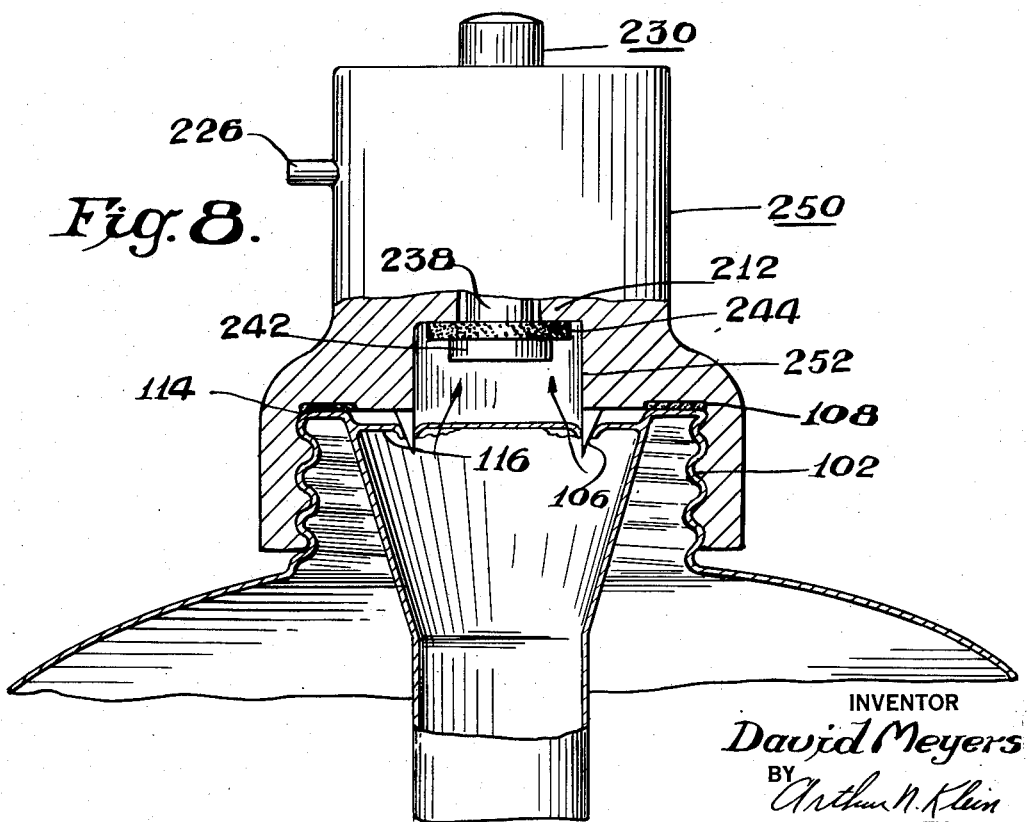
INVENTOR
David Meyers
BY
Arthur N. Klein
ATTORNEY

United States Patent Office 2,772,814
Patented Dec. 4, 1956

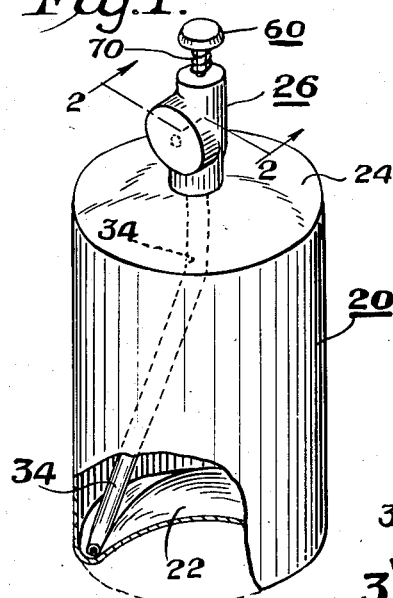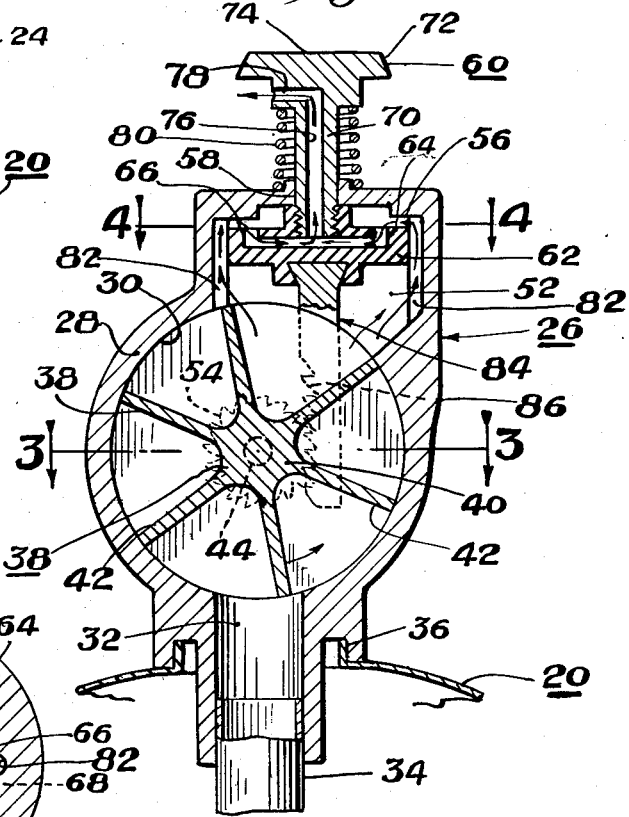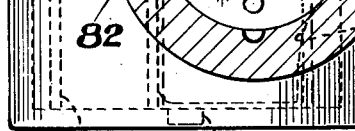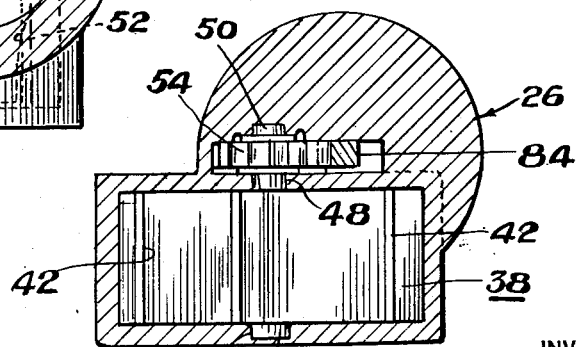

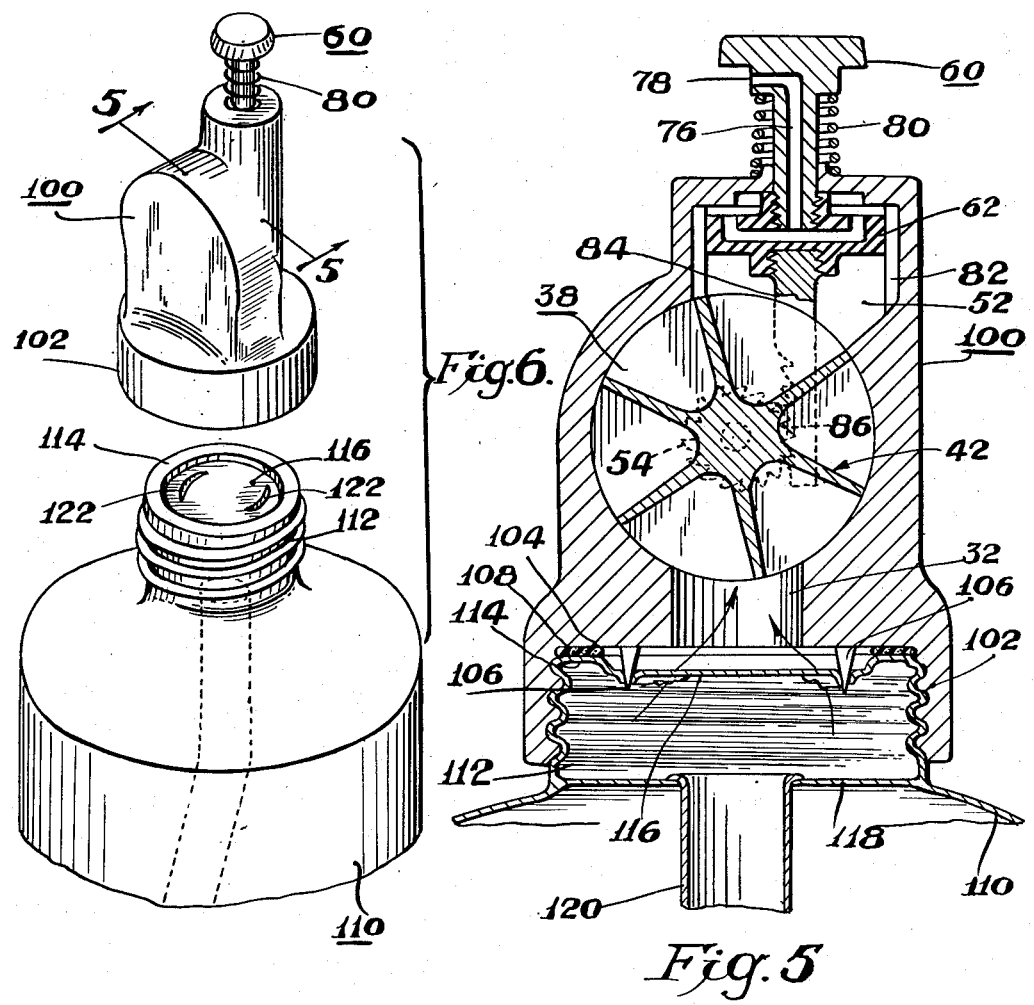

2,772,814

MEASURING VALVE FOR PRESSURE CONTAINERS

David Meyers, Elkins Park, Pa.

Application April 28, 1953, Serial No. 351,561

12 Claims. (Cl. 222—82)

The present invention relates generally to dispensing devices for volatile products held under pressure in closed containers and it relates more particularly to dispensing and metering valves for use with pressurized cans containing volatilizable materials.

An object of the present invention is to provide a new and useful dispensing and metering valve for use with sealed cans, or like containers, holding volatilizable materials under pressure. Another object of the present invention is to provide novel manually operated dispensing valve mechanism which will deliver a relatively constant predetermined volume of volatilizable material from a pressurized can or the like, at each operation thereof. Still another object of the present invention is to provide novel dispensing valve mechanism, adapted particularly for use with sealed pressurized cans or the like containing volatilizable material which forms a lather or foam or cream when released from the can; the dispensing valve mechanism being constructed and arranged to deliver a predetermined relatively constant volume of the dispensed material at each manual operation thereof.

Other objects and advantages of the present invention are apparent in the following detailed description, appended claims and accompanying drawings.

It is customary to provide sealed cans or the like containing liquified Freon or other volatilizable material under pressure and also containing an ingredient which is carried along with the Freon, when the latter is permitted to escape from the can. Among materials packaged in this manner are various insecticides, deodorizers, etc. which are dispensed as a spray, generally in aerosol form. Another category of materials packaged in this manner includes shaving creams, dry-cleaning foams, edible whipped cream, and other materials which are dispensed in the form of a lather or suds or foam or aerated cream.

One difficulty encountered in connection with pressurized cans of this nature is the fact that it is extremely difficult, with the conventional finger-operated release valves commonly employed, to deliver a predetermined quantity or volume of the material to be dispensed. That is, the average user is not able to control the conventional finger-operated release valve with sufficient accuracy to attain any degree of consistency in the quantity or volume of material dispensed with each operation of the valve. Another complication is the fact that, even if it were possible to open the conventional finger-operated valve for precisely the same period of time, in each instance, the drop in internal pressure as the Freon is gradually used up would make for corresponding variations in the volume of material dispensed.

This problem is an especially serious one in connection with the dispensing of lather or foam or suds since, in this case, it is highly desirable (in order to avoid waste) that the user be able to dispense a relatively constant predetermined volume of the material with each operation of the valve.

The present invention contemplates a new and improved dispensing valve construction for this type of pressurized can, which will deliver a relatively constant volume of the material to be dispensed, each time the valve is manually operated and regardless of variations in internal pressure in the can.

Generally speaking, the novel dispensing valve of the present invention includes means, associated with and operated by a manual on-off valve, whereby a predetermined volume of the material to be dispensed can escape through an outlet nozzle, with each operation of the valve.

For the purpose of illustrating the invention, there are shown in the accompanying drawings forms thereof which are presently preferred, it being understood, however, that the present invention is not limited to the precise arrangements and instrumentalities shown, and that the various parts and elements can be variously arranged and organized without departing from the spirit of the invention.

Referring to the accompanying drawings in which like reference characters indicate like parts throughout:

Figure 1 is a perspective view of a can provided with a metering dispensing valve forming one embodiment of the present invention, parts being broken away better to reveal the construction thereof.

Figure 2 is a fragmentary enlarged vertical cross-sectional view taken generally along the line 2—2 of Fig. 1.

Figure 3 is a horizontal cross-sectional view taken generally along the line 3—3 of Fig. 2.

Figure 4 is a horizontal cross-sectional view taken generally along the line 4—4 of Fig. 2.

Figure 5 is a cross-sectional view generally like that of Fig. 2 but showing a modified form in which the valve mechanism is incorporated into a separate dispensing head intended to be detachably secured to a disposable sealed pressurized can.

Figure 6 is a perspective view showing the dispensing head of Fig. 5 as it appears when removed from an empty can.

Figure 7 is a vertical cross-sectional view like that of Fig. 2 but showing another embodiment of the present invention.

Figure 8 is a view, partly in section and partly in elevation, showing a modified form of the embodiment of Fig. 7.

Referring to the embodiment of Figs. 1–4, I may provide a generally cylindrical can body 20 having a dished bottom 22 and a rounded sloping top wall 24.

Permanently secured to the central uppermost portion of the top wall 24, in any suitable manner, is a dispensing head, indicated generally by the reference character 26. The dispensing head 26 includes a housing 28 which provides a hollow, generally circular, flat-sided metering chamber 30. A cylindrical passage 32 extends downward from the bottom of the metering chamber 30 and communicates with the upper end of a standpipe 34, supported within the lower end of the passage 32 by a plate 36 and extending downward therefrom to adjacent the bottom wall 22.

Disposed within the metering chamber 30 is a rotor 38 having a hub 40 and a plurality of radially outwardly extending vanes 42 which fit relatively snugly against the flat side walls and the cylindrical wall of the metering chamber so as to form a plurality of circumferentially-distributed enclosed sector-shaped compartments therewithin, as shown in Fig. 2. The hub of the rotor is mounted on a shaft 44 which, as best shown in Fig. 3, is journaled, at one end, within an indentation 46 formed in one of the side walls of the housing 28. The other end 50 of the shaft 44 extends through an opening 48 formed in the opposite end wall of the housing 28 and into a generally vertical passageway 52 disposed alongside the metering chamber 30 and communicating therewith at the upper portion thereof. Keyed to the protruding end 50 of the shaft 44 is a spur gear 54, the purpose of which will be hereinafter described.

The upper end of the vertical passageway 52 is provided with an annular valve seat 56 and a central opening 58 in its top wall.

A vertically reciprocable operating member, indicated generally by the reference character 60, is mounted at the upper end of the passageway 52. The operating member 60 includes a generally cylindrical valve member 62, the upper peripheral edge or rim 64 thereof being adapted to make fluid-tight contact with the annular valve seat 56.

A plurality (for example four) of axial openings 66 extend downward from the top wall of the valve member 62, somewhat inwardly of the rim 64; the lower ends of the opening 66 communicating with a corresponding number of radially inwardly extending openings 68, which meet at the center of the valve member 62, as best shown in Figs. 2 and 4.

Screw-threadedly connected to the top of the valve member 62 is the lowermost end of the stem 70 of a push-button 72 having an uppermost enlarged head 74. The stem 70 is axially apertured as at 76 so as to communicate with the central ends of the radial openings 68. The upper end of the axial aperture 76 communicates with the outlet opening or nozzle 78 disposed slightly below the head 74 of the push-button 72. Disposed about the stem 70 is a helical spring 80 which urges the push-button and valve member upwardly so as normally to maintain the valve in closed position; that is, with the peripheral edge 64 in fluid-tight sealing relationship with the annular valve seat 56.

The cylindrical wall of the passageway 52 is provided with a plurality (for example four) of axially-extending by-pass grooves 82 which permit flow of fluid upward across the periphery of the valve member 62 when the latter is in open position, as indicated by the arrows in Fig. 2.

Fastened to the underside of the valve member 62 and extending downward therefrom is an elongated rack member 84, upon which are formed a plurality of vertically-distributed upwardly-directed teeth 86 constructed and arranged to engage with the teeth of the spur gear 54, upon upward movement of the rack 84.

The rack 84 is made of somewhat resilient material so that, upon downward movement thereof, it is capable of being displaced slightly to enable its undercut teeth 86 to move past the spur gear teeth without causing rotation of the spur gear. However, upon upward movement of the rack 84, the teeth 86 thereof will engage the spur gear teeth and cause rotation (counterclockwise in Fig. 2) of the spur gear and the rotor 38.

The operation of the above-described embodiment is as follows. Assuming that the can 20 contains a supply of liquified Freon or other volatilizable material under super-atmospheric pressure, along with lather or foam or cream forming ingredients, manual depression of the push-button 72, against the pressure of its spring 80, will move the valve member 62 to open position and, at the same time, will move the rack 84 downward relative to the spur gear 54. Release of the push-button 72 causes the latter to move upward slightly, under the action of its spring 80, and, in so doing, causes the rack 84 to engage and rotate the spur gear 54. This in turn causes rotation of the rotor 38 and brings successive sector-shaped compartments into communication with the passageway 52.

As each sector-shaped compartment comes into communication with the standpipe 34, it is filled with the Freon, still under super-atmospheric pressure. Continued rotation of the rotor (counterclockwise in Fig. 2) shifts the compartment out of communication with the standpipe and provides a fluid-tight chamber which maintains the Freon at super-atmospheric pressure until the compartment reaches the topmost position of Fig. 2, wherein it is in communication with the outlet passageway (assuming that the outlet valve member is still open). At this point, the liquified super-atmospheric Freon within the said topmost compartment is free to expand to atmospheric pressure and to escape through the outlet nozzle and, in so doing, creates and dispenses the lather or foam. After having been so vented, the said compartment continues its counterclockwise rotation (assuming that the rack 84 has not yet fully returned to its uppermost position) and, once again, comes into communication with the standpipe (either on the same upward stroke or the next upward stroke of the rack 84) so as to be refilled with super-atmospheric liquified Freon.

It is apparent that, after the push-button has been fully depressed, a predetermined number of the sector-shaped compartments will be brought into communication with the passageway 52 before the valve member 62 is re-closed by the spring 80. In this way, only a predetermined volume of the vaporizable material can escape from the can before reclosing of the valve.

It is apparent that the ratio of the meshing teeth of the spur gear and the rack determines the extent of rotation of the rotor with each stroke of the push-button. Obviously, by varying this ratio and by changing the stroke of the push-button, the quantity of material dispensed can be adjusted to the desired figure.

If desired, conventional intermediate gearing (not shown) can be provided between the spur gear 54 and the rack 84 to give increased rotation of the rotor with a relatively short stroke of the push-button.

It is obvious that the quantity of material dispensed with each operation of the push-button is relatively constant and more or less independent of the internal pressure of the can. That is, so long as the can contains sufficient volatilizable material to create the internal pressure needed to force the material up through the standpipe and into the sector-shaped compartments of the rotor, the total volume delivered by the rotor with each operation of the push-button is more or less the same. Of course, once the internal pressure becomes too small to force the liquid up through the standpipe, the can is exhausted and inoperative, just as with conventional constructions.

The dispensing head and associated parts of Figs. 1-4 are intended to be fabricated of relatively inexpensive and easily assembled parts so that the total cost is sufficiently low to permit the entire can to be discarded after its contents have been used up.

By use of suitable mass production techniques, I contemplate that the entire assembly can be manufactured for a matter of a few cents to permit its incorporation in throw-away cans. The slight additional cost, as compared to conventional cans heretofore employed, is more than compensated for by elimination of the waste of the contents due to delivery of excessive quantities thereof, such as occurs with conventional cans.

In addition to the savings afforded thereby, the novel construction of the present invention will commend itself to the purchaser by reason of the greater convenience and ease of operation thereof.

In Figs. 5 and 6 there is shown a modified form of the embodiment of Figs. 1-4. Thus, in the embodiment of Figs. 5 and 6 I provide a dispensing head 100 which is generally the same as the dispensing head 26 described above, except that, instead of being permanently affixed to the can body, it is constructed and arranged to be detachably secured to the can in a manner permitting it to be used over and over again with individual discardable cans.

Thus, the lower end of the dispensing head 100 is provided with a downwardly-directed, internally threaded socket 102 having a generally flat circular top wall 104; the lower end of the passage 32 communicating with the socket 102 generally at the center of the wall 104. A plurality of circumferentially distributed downwardly-directed relatively sharp cutting prongs 106 are formed on the wall 104 and an annular compressible sealing gasket 108 is seated against the periphery of said wall 104.

In this embodiment, the can 110 is provided with an upwardly-directed externally threaded neck 112 provided with an uppermost annular shoulder 114 adapted to seat against, and to provide a fluid-tight seal with, the gasket 108 of the dispensing head 100. The top of the neck 112 is also provided with a flat circular puncturable wall 116 disposed radially inwardly of the annular shoulder 114 and recessed axially somewhat relative thereto.

At the base of the neck 112, there is provided a supporting plate 118 (similar to the plate 36 described above) which holds the upper end of a standpipe 120; the standpipe extending downward to adjacent the bottom of the can 110 in the manner described hereinabove.

The can 110 is manufactured as a vendable sealed unit containing a volatilizable material (such as liquified Freon) under pressure together with lather or a foam or suds or cream forming ingredients, or aerosol-forming insecticides, deodorizers, etc.

The dispensing head 100 is constructed and arranged to be connected to the can by positioning the socket 102 over the neck 112 and screwing down the head 100 until fluid-tight sealing contact is made between the shoulder 114 and the gasket 108. The cutting prongs 106 are so proportioned that the last fraction of a turn required to effect this fluid-tight sealing relationship causes the prongs 106 to pierce the puncturable wall 116 and to form arcuate cuts or slits 122 in said wall 116, as indicated in Fig. 6. This establishes communication between the standpipe 120 and the passage 32, so that each manual stroke of the push-button 72 will cause a predetermined volume or quantity of the can contents to be dispensed in the manner described above in connection with the embodiment of Figs 1–4.

Since the dispensing head 100 is intended to be used indefinitely (instead of being discarded with the empty can), it obviously can be manufactured of sturdier and longer-lasting materials. In other words, the purchaser will be willing to pay a reasonable price for the dispensing head, knowing that he can use it over and over again with separate disposable cans.

This provides the additional advantage of reducing the cost of the vendable can, even as compared to conventional constructions heretofore employed, inasmuch as it is unnecessary to provide the cans with even the simple on-off valves heretofore required.

In Fig. 7, there is shown another embodiment of the present invention constructed and arranged to deliver a relatively constant volume of material from a pressurized can with each manual stroke of an operating member. In this embodiment I may provide a can body 200 (generally like the can 20 of Fig. 1) having an upwardly-directed dispensing head indicated generally by the reference character 202. This dispensing head 202 includes a depending skirt portion 204 having a cylindrical inner surface or bore 206. A standpipe 208 is connected to the lower end of the skirt portion 204 and communicates with the bore 206; the lower end of the standpipe terminating adjacent the bottom of the can.

Within the upper portion of the dispensing head 202 there is formed a generally cylindrical chamber or bore 210. An inwardly-directed annular shoulder 212 is provided intermediate the bores 206 and 210; a reduced-diameter central passage 214 connecting said bores.

An enlarged counterbore 216 is provided at the upper end of the chamber 210; the counterbore 216 extending to the generally flat circular top wall 218 of the dispensing head 202. The top wall 218 is provided with a central opening 220, the purpose of which will be apparent from the following description.

Extending downward from the annular wall 222 forming the lower end of the counterbore 216 is a passageway 224 which communicates with a delivery nozzle 226 protruding generally laterally from the dispensing head 202, somewhat below the upper end thereof.

An operating member, indicated generally by the reference character 228, includes an upper element 230 preferably formed of somewhat compressible material capable of forming a fluid-tight seal when pressed against a metal or other hard surface. The element 230 includes a cylindrical central push-button portion 232 which extends through the central opening 220 of the top wall 218 in relatively snugly fitting relationship thereto. The element 230 also includes an enlarged-diameter main cylindrical portion 234 constructed and arranged to slide in fluid-tight sealing relationship within the counterbore 216. The main cylindrical portion 234 is provided with a downwardly-directed annular shoulder 236 which is adapted to seat against the annular wall 222 when the element 230 is in lowermost position, thereby sealing off the outlet passageway 224.

An elongated generally cylindrical valve stem 238 is screw-threadedly or otherwise suitably connected to the underside of the element 230 and extends downwardly therefrom through the chamber 210 and the reduced-diameter connecting passage 214. At the lower end of the valve stem 238 there is provided a reduced-diameter neck portion 240 and an enlarged cylindrical valve head 242. A compressible sealing gasket 244, which is centrally apertured so as to fit snugly about the neck portion 240, is mounted upon the upper surface of the valve head 242 and is constructed and arranged to effect a fluid-tight seal intermediate the valve head and the lower end of the connecting passage 214 when the operating member 228 is in uppermost position.

A helical compression spring 246 is disposed about the valve stem 238; the lower end of the spring being seated against the upper face of the annular shoulder 212, while the upper end of the spring bears against the underside of the element 230 so as normally to urge the operating member 228 to uppermost position shown in Fig. 7.

In this position, the passage 214 is closed while the outlet passage 224 is open so that the upper chamber 210 is vented to the atmosphere, while the lower chamber or bore 206 is at the super-atmospheric pressure existing within the can body 200.

When the push-button portion 232 is manually depressed, the operating member 228 is moved downward against the pressure of the spring 246 so as to unseat the sealing gasket 244. This enables the liquified super-atmospheric Freon in the can to move upward, under internal pressure, and to enter the upper chamber 210. Downward movement of the operating member also causes the shoulder 236 to close off the outlet passageway 224. However, closing of the outlet passageway occurs slightly after the initial opening of the passage 214 which permits the greater part of the air originally occupying the chamber 210 to be swept out by the incoming pressurized material, so as to minimize dilution of the latter.

As the chamber 210 fills with the can contents still under super-atmospheric pressure, the pressure generated against the underside of the cylindrical portion 234 will force it back upward to its original position, thereby closing the passage 214 and opening the outlet passageway 224. Opening of the outlet passageway 224 vents the chamber 210 to the outside and enables the liquified super-atmospheric Freon to expand to atmospheric pressure and to escape through the passageway 224 and nozzle 226 and, in so doing, generates the lather or foam. When the push-button portion 232 is again manually depressed, the cycle (of filling the chamber 210 with super-atmospheric Freon and then venting it through the nozzle 226) is repeated.

Since the area of the underside of the cylindrical portion 234 is greater than the area at the top of the push-button portion 232, it is obvious that the upward pressure exerted upon the operating member 228 when the chamber 210 is filled with the pressurized can contents is sufficiently great to return the operating member to its original uppermost position automatically and even though the user may attempt to keep the push-button down. This ensures delivery of only the predetermined volume occupying the chamber 210 and prevents continuous delivery such as would occur if the user inadvertently held the push-button portion at some intermediate position which would keep both the passage 214 and the passageway 224 open.

In this way, the user is assured of delivery of a constant predetermined volume of the pressurized can contents with each manual depression of the push-button portion.

In Fig. 8 there is shown a modified form of the embodiment of Fig. 7. This embodiment includes a dispensing head 250 which is generally identical with the dispensing head 202 described above, except that, instead of being formed as an integral part of the can body as in Fig. 7, it is formed as a separate unit which is constructed and arranged to be detachably connected to the can 110 of Figs. 5 and 6.

Thus, in place of the skirt portion 204 of Fig. 7, the dispensing head 250 is provided with a downwardly-directed internally threaded socket 102 identical with that shown in Fig. 5 and a cylindrical bore extending upward therefrom to the reduced-diameter passage 214 described above.

When the socket 102 of the dispensing head 250 is positioned upon the threaded neck 112 of the can 110 and screwed downward into fluid-tight sealing relationship therewith, the cutting prongs 106 puncture the wall 116, establishing communication between the standpipe 120 of the can and the bore 252 so that manual depression of the push-button portion 232 will cause delivery of a predetermined volume of pressurized contents in precisely the same manner as described above in connection with the embodiment of Fig. 7.

Since the separate dispensing head 250 of this embodiment can be used over and over again with separate disposable sealed cans, it can be sold at a reasonable price enabling it to be constructed of stronger and more durable materials than is possible with the one-use unit of Fig. 7.

The present invention may be embodied in other specific forms and, accordingly, the foregoing embodiments are to be considered merely as illustrative and not restrictive, reference being made to the appended claims as indicating the scope of this invention.

Having thus described my invention, I claim as new and desire to protect by Letters Patent:

1. A dispensing head for use with pressure cans and adapted to deliver a relatively constant predetermined volume of the pressurized expansible fluid contents of the can with each operation thereof, said dispensing head comprising a housing having a metering chamber formed therein and having an outlet passageway and nozzle communicating with said chamber, an outlet valve mounted in said housing and constructed and arranged to open and close said outlet passageway, means including an inlet passageway formed in said housing and communicating with said metering chamber for delivering the pressurized fluid can contents to said chamber, manually operable actuating means mounted in said housing and including a reciprocable operating member connected with said outlet valve, said operating member being normally spring-tensioned to outermost position and being manually movable inward against spring-tension to actuate the outlet valve, and a control member movably mounted within said housing and operatively connected to said operating member for movement therewith, said control member being constructed and arranged to control the flow of fluid from the inlet passageway through said metering chamber, said actuating means being constructed and arranged to initiate delivery of the pressurized fluid can contents to the metering chamber following inward movement of the operating member and, during subsequent outward movement of the operating member, to terminate such delivery after a predetermined volume of the pressurized fluid can contents has been delivered to the chamber and then to permit the pressurized fluid in the chamber to expand and escape through the outlet valve, outlet passageway and nozzle.

2. A construction according to claim 1 wherein the dispensing head is formed as a more or less unitary part of a disposable pressure can.

3. A construction according to claim 1 wherein the dispensing head is formed as a separate unit and is provided with means for detachably connecting it to a sealed pressure can in fluid tight sealing relationship therewith.

4. A construction according to claim 3 wherein the can is provided with a puncturable top wall and the dispensing head is provided with means for puncturing said wall more or less simultaneously with the interconnection thereof, so as to effect intercommunication between the can and the dispensing head.

5. A construction according to claim 1 wherein the metering chamber is generally circular and wherein the control member comprises a rotor having a plurality of vanes and rotatably mounted within the chamber, and wherein the outlet valve element is normally spring-tensioned to closed position and is manually movable to open position and wherein the control member is provided with gearing operatively connecting it to said rotor, whereby gradual spring-actuated movement of the valve element back toward closed position causes metering rotation of the rotor so as to permit escape of a predetermined volume of can contents through the nozzle prior to re-closing of the valve element.

6. A construction according to claim 5 wherein the dispensing head is formed as a more or less unitary part of a disposable pressure can.

7. A construction according to claim 5 wherein the dispensing head is formed as a separate unit and is provided with means for detachably connecting it to a sealed pressure can in fluid tight sealing relationship therewith.

8. A construction according to claim 1 wherein the control member comprises an inlet valve for the metering chamber which is reciprocably movable with the operating member, said operating member being normally spring-tensioned to position wherein the inlet valve is closed and the outlet valve is open so that the metering chamber is vented to the outside through the delivery nozzle, said operating member being manually movable to position opening the inlet valve and closing the outlet valve whereby the metering chamber is filled with the can contents under pressure, release of the operating member permitting spring-actuated return movement thereof, whereby the inlet valve is closed and the outlet valve opened to permit escape of the contents of the metering chamber through the delivery nozzle.

9. A construction according to claim 8 wherein the outlet valve is constructed and arranged to close slightly after opening of the inlet-valve so as to permit preliminary flushing out of the metering chamber.

10. A construction according to claim 9 wherein the operating member includes a piston-like portion operating within a cylindrical bore and acted upon by the pressure of the can contents admitted to the metering chamber, whereby the pressure of the can contents augments the spring-action and automatically returns the operating member to the original position after manual movement thereof.

11. A construction according to claim 10 wherein the dispensing head is formed as a more or less unitary part of a disposable pressure can.

12. A construction according to claim 10 wherein the dispensing head is formed as a separate unit and is provided with means for detachably connecting it to a sealed pressure can in fluid tight sealing relationship therewith.

References Cited in the file of this patent

UNITED STATES PATENTS

| | | |
|---|---|---|
| 886,386 | Maxwell | May 5, 1908 |
| 1,899,222 | Werder | Feb. 28, 1933 |
| 2,322,866 | Merz | June 29, 1943 |
| 2,586,088 | Reeves | Feb. 19, 1952 |
| 2,693,983 | Howell | Nov. 9, 1954 |
| 2,701,163 | Teller et al. | Feb. 1, 1955 |